(12) United States Patent
Bode et al.

(10) Patent No.: US 12,478,970 B2
(45) Date of Patent: Nov. 25, 2025

(54) SENSOR POSITIONING SYSTEM FOR A BIOPROCESS ENGINEERING INSTALLATION

(71) Applicant: Sartorius Stedim Biotech GmbH, Goettingen (DE)

(72) Inventors: Matthias Bode, Bodensee (DE); Christian Grimm, Heilbad Heiligenstadt (DE); Thorsten Adams, Goettingen (DE); Jens Rupprecht, Hildesheim (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 1095 days.

(21) Appl. No.: 17/442,866

(22) PCT Filed: Jan. 15, 2020

(86) PCT No.: PCT/EP2020/050921
§ 371 (c)(1),
(2) Date: Sep. 24, 2021

(87) PCT Pub. No.: WO2020/192976
PCT Pub. Date: Oct. 1, 2020

(65) Prior Publication Data
US 2022/0143619 A1    May 12, 2022

(30) Foreign Application Priority Data

Mar. 25, 2019 (DE) .......................... 10 2019 107622

(51) Int. Cl.
*C12M 1/00* (2006.01)
*B01L 9/00* (2006.01)
(Continued)

(52) U.S. Cl.
CPC ............... *B01L 9/00* (2013.01); *C12M 23/26* (2013.01); *C12M 23/28* (2013.01); *C12M 23/46* (2013.01);
(Continued)

(58) Field of Classification Search
CPC ................................. B01L 9/00; C12M 23/28
See application file for complete search history.

(56) References Cited

U.S. PATENT DOCUMENTS 9,975,658 B2    5/2018   Rönnholm et al.
2011/0201100 A1*  8/2011  Proulx ................... C12M 23/44
                                                     435/287.1
(Continued)

FOREIGN PATENT DOCUMENTS

DE    102006001623    7/2007
DE    102010060131    4/2012
(Continued)

OTHER PUBLICATIONS

Document entitled DE102013109820A1, machine translation of DE 10 2013 109 820 A1 by Espacenet, original document published 2015. (Year: 2015).*
(Continued)

*Primary Examiner* — Nathan A Bowers
(74) *Attorney, Agent, or Firm* — Pauly, DeVries Smith & Deffner LLC

(57) ABSTRACT

A sensor positioning system for a bioprocess engineering unit, wherein a container is provided for receiving a biological medium which, when installed, extends in the axial direction from an upper container end to a lower container end, wherein a holder is provided for holding the container when installed, wherein a sensor is provided for fixing to the container. A positioning aid device for positioning the sensor to be fixed is provided on the container, the positioning aid
(Continued)

device has a positioning aid that can be applied directly to or near the container on the holder, which can be brought into different vertical positions and/or circumferential positions relative to at least one reference point provided on the container and/or holder, and the positioning aid device has a technical storage medium or analog print medium with an allocation list.

14 Claims, 3 Drawing Sheets

(51) Int. Cl.
    *C12M 1/06*     (2006.01)
    *C12M 1/34*     (2006.01)
    *C12M 3/00*     (2006.01)
    *G01F 23/00*     (2022.01)

(52) U.S. Cl.
    CPC ............ *C12M 27/02* (2013.01); *C12M 41/44* (2013.01); *G01F 23/0007* (2013.01); *B01L 2200/025* (2013.01); *B01L 2300/0609* (2013.01)

(56) References Cited

U.S. PATENT DOCUMENTS

2013/0101982 A1     4/2013     Goodwin et al.
2015/0218501 A1*     8/2015     Kauling ................. C12M 29/20
                                                           435/325
2018/0010082 A1*     1/2018     Jaques ..................... B01F 27/86
2018/0327708 A1*    11/2018     Cannon .................. C12M 41/48
2019/0211294 A1*     7/2019     Karnieli ................. C12M 41/48
2021/0024864 A1*     1/2021     Miller .................... C12M 23/14

FOREIGN PATENT DOCUMENTS

| DE | 102013109820 | 3/2015 |
|---|---|---|
| DE | 102015007060 | 12/2016 |
| DE | 102016000997 | 2/2017 |
| WO | 2020192976 | 10/2020 |

OTHER PUBLICATIONS

English translation of DE 102006001623 to Baumfalk et al., generated 2025.*
"German Search Report," for German Patent Application No. 102019107622.6 mailed Mar. 3, 2020 (6 pages).
"International Preliminary Report on Patentability," for PCT Application No. PCT/EP2020/050921 mailed Sep. 28, 2021 (7 pages).
"International Search Report and Written Opinion," for PCT Application No. PCT/EP2020/050921 mailed Apr. 21, 2020 (15 pages).

* cited by examiner

SENSOR POSITIONING SYSTEM FOR A BIOPROCESS ENGINEERING INSTALLATION

CROSS-REFERENCE TO RELATED APPLICATIONS

This application is a national stage application under 35 U.S.C. 371 of International Patent Application Serial No. PCT/EP2020/050921, entitled "Sensor Positioning System for a Bioprocess Engineering Installation," filed Jan. 15, 2020, which claims priority from German Patent Application No. DE 10 2019 107 622.6, filed Mar. 25, 2019, the disclosure of which is incorporated herein by reference.

FIELD OF THE TECHNOLOGY

The disclosure relates to various sensor positioning systems for bioprocess engineering units, a bioprocess engineering unit with a sensor positioning system, and to a method for positioning a sensor of a bioprocess engineering unit.

BACKGROUND

Generally speaking, the term "bioprocess engineering unit" as used here should be understood to mean a device with which the biotechnological process can be carried out or supported. Bioreactors are mentioned here purely by way of example; in them, microorganisms or tissue cells are cultured under predetermined conditions. Further examples of bioprocess engineering units that may be mentioned here are process mixing systems, which can be used for mixing powders, suspensions, solutions or emulsions that are used in biotechnological processes. Devices of this type usually have a container in which a biological medium produced from the substances provided for a biotechnological process, for example microorganisms or tissue cells on the one hand and an appropriate nutrient medium on the other hand, are received, in order to be able to carry out the respective biotechnological step of the method, for example fermentation or culture and/or thorough mixing. The product, in the case of a bioreactor, for example the fermentation broth, is then usually treated further in what is known as a downstream process in order to obtain a product from the cells or from the culture supernatant.

On the one hand, a dimensionally stable vessel may be used as a container for such a bioprocess engineering unit, but on the other hand, a flexible, i.e. limp bag, also referred to as a bioprocess bag, may be used. In line with current trends, both the dimensionally stable vessel as well as the bioprocess bag can be configured as single-use containers. In addition, such a container may already be provided with an integrated stirring apparatus, with which the biological medium can be thoroughly mixed. Frequently in the context of culture and/or because of the thorough mixing, a foam appears as a disturbing factor above the level of the fluid. In this regard, the risk often arises that the foam will rise into the air extraction filter of the bioprocess engineering unit, for example the bioreactor, and result in blocking the filter. The resulting very rapid rise in pressure in the bioprocess engineering unit makes further regulation of the oxygen content in the biological medium in the container almost impossible. As a consequence, then, in the worst-case scenario, an entire batch has to be discarded. Particularly in the pharmaceuticals industry, this could lead to production losses which run into millions.

From the prior art (DE 10 2013 109 820 A1), which forms the starting point of the disclosure, the use of fill level sensors for the detection of foam as a disturbing factor is therefore known. These are configured therein as what are known as fill level limit switches and are disposed in the interior of the container with the biological medium. In this regard, to match the bioprocess engineering unit to different bioprocess engineering applications, a sensor positioning system is provided which enables the fill level sensor to be positioned at different vertical positions. Thus, in this case, the sensor has two electrically conductive plates which are disposed at different heights in the container and between which the conductivity or impedance of the foam surrounding the plates is determined. In this regard, the respectively higher plate, i.e. that which is further from the fluid level, can be disposed in different positions in the axial direction of the container or, as therein, in the vertical position.

In this regard, providing the fill level sensor in the optimal vertical position for a specific bioprocess engineering application is left to the experience and skill of the user who is setting up the bioprocess engineering unit. A reliable standardized method for an application-specific optimal positioning of a fill level sensor has not existed up to now.

SUMMARY

A problem to be solved by the embodiments herein is to configure and develop a sensor positioning system for a bioprocess engineering unit which can carry out, in the simplest way possible, optimal positioning of a fill level sensor in a container for the bioprocess engineering unit for a specific bioprocess engineering application.

In the case of a sensor positioning system for a bioprocess engineering unit, the aforementioned problem is solved by the features included herein.

A premise of providing a positioning aid device by means of which the user is shown for a specific bioprocess engineering application the optimal position for fixing an in particular adhesive sensor, for example a fill level sensor, in particular a foam sensor can be appreciated. To this end, a positioning aid is provided which, relative to a defined reference point on the bioprocess engineering unit, is brought into a predetermined vertical position and/or circumferential position for the respective application and with which the sensor to be fixed can then be aligned. In this regard, "vertical positions" are positions relative to the container in the vertical direction, i.e. in the direction in which the axial central axis of the container runs; it usually extends vertically. "Circumferential positions" are positions relative to the container in the circumferential direction, i.e. around the axial central axis of the container. The sensor can then be fixed to the container in the position that is indicated to the user or predetermined by means of the positioning aid.

In this regard, the respective correct vertical and/or circumferential position of the positioning aid is determined by means of an allocation list which contains an allocated vertical and/or circumferential position for each of a plurality of applications. The vertical or circumferential positions can be filed in the allocation list as distances to the respective reference point and/or as fixed positions relative to the respective reference point which can be indicated by means of the positioning aid. Thus, the allocation list provides precisely one unique vertical and/or circumferential position into which the positioning aid must be brought for a specific application, wherein in this vertical and/or circumferential position, the positioning aid then indicates to the user the associated position for the sensor at which it has to be fixed to the container.

In detail, it is now proposed that a positioning aid device for positioning the sensor to be fixed is provided on the container in a predetermined position, that the positioning aid device has a positioning aid that is applied or can be applied directly to the container or near the container on the holder, which can be brought into different vertical positions and/or circumferential positions relative to at least one reference point provided on the container and/or holder, and that the positioning aid device has a technical storage medium or analog print medium with an allocation list in which a plurality of bioprocess engineering applications are respectively allocated a predetermined vertical position and/or circumferential position of the positioning aid.

A "technical storage medium", also known as a data carrier, may in general be an electronic, magnetic, optical or photographic storage medium for storing the allocation list. An "analog print medium" may be a medium in the form of paper or a foil for storing the allocation list, for example paper with a printed or written allocation list or foil which is printed or written on.

Various embodiments of the storage medium or print medium and of the allocation list are disclosed.

Various embodiments relate to how the positioning aid can be brought to the respective vertical positions and circumferential positions. In particular, the positioning aid in its entirety may be disposed in the position, i.e. in the vertical position and/or in the circumferential position, given by the allocation list in the axial direction, i.e. along the central axis of the container and/or in the circumferential direction. In principle, however, it is also possible for only a mobile portion of the positioning aid to be brought into the respective vertical position and/or circumferential position, whereas the rest of the positioning aid is immobile.

Various embodiments of the positioning aid are disclosed. In this regard, they can provide at least one marking with which the sensor can be aligned. Provision of a marking can on the one hand consist in that the positioning aid has at least one marking, i.e., for example, a marking applied thereto. On the other hand, the positioning aid per se may also form the marking, i.e. the positioning aid itself is simultaneously the marking.

Various arrangements of the positioning aid and the storage medium or print medium relative to the rest of the sensor positioning system are disclosed.

Various embodiments of the container, which can be a bioprocess bag or a dimensionally stable vessel are disclosed. In particular, the container is a single-use container. The container may also have an integrated stirring apparatus.

Various embodiments define reference points relative to which the positioning aid can be brought into the various vertical positions and/or circumferential positions.

Various embodiments of the sensor, which is for example a fill level sensor, are disclosed. However, sensors for determining other physical parameters may also be envisaged. The term "fill level sensor" as used here should be construed broadly and encompasses both fill level limit switches, i.e. sensors for monitoring limit levels, as well as sensors for continuously measuring the fill level. With a fill level sensor, in general, the transition of the boundary layer between two media (for example foam/fluid or fluid/fluid) and/or physical states (for example gaseous phase/liquid phase) can be determined or monitored. The medium may also be a two-phase or three-phase mixture.

In accordance with various embodiments, a sensor positioning system for a bioprocess engineering unit is disclosed in which the positioning aid for the positioning aid device can be not vertically adjustable and not adjustable in the circumferential direction, but is provided directly on the container. A positioning aid of this type may already, for example, have been printed onto or adhered to the container by the manufacturer, for example as a scale. In accordance with this further tenet, with the aid of the allocation list, the sensor itself is brought into a predetermined vertical position and/or circumferential position, whereas the positioning aid in particular is immobile. In this regard, "vertical positions" are positions relative to the positioning aid in the vertical direction, i.e. in the direction in which the axial central axis of the container runs, which usually extends vertically. "Circumferential positions" are positions relative to the positioning aid in the circumferential direction, i.e. around the axial central axis of the container. Finally, as regards the proposed sensor positioning system, reference should be made to the further tenet of all of the embodiments of the first-mentioned tenet.

In accordance with various embodiments, a bioprocess engineering unit, in particular a bioreactor or process mixing system, is disclosed with the proposed sensor positioning system. In view of the fact that the proposed bioprocess engineering unit has a proposed sensor positioning system, all of the embodiments pertaining to the first-mentioned tenet are of relevance.

In accordance with various embodiments, a method is disclosed for positioning a sensor of a bioprocess engineering unit, in particular using a sensor positioning system as proposed, wherein a container, in particular a single-use container, is provided for receiving a biological medium, wherein the container is received by a holder which holds the container in a manner such that the container extends in the axial direction from an upper container end to a lower container end. The proposed method is characterized in that after the container has been received by the holder, the sensor is aligned with a positioning aid of a positioning aid device and fixed to the container, wherein the alignment is based on a predetermined vertical position and/or circumferential position which is allocated to one of a plurality of bioprocess engineering applications in an allocation list of a technical storage medium or analog print medium. With the proposed method, a plurality of sensors, in particular different sensors, can also be aligned and fixed on the container 3 in the predetermined positions for the respective application. As regards the proposed method, reference should be made to all of the embodiments of the further tenet.

Various embodiments of the method are disclosed. Thus, on the one hand the positioning aid can be brought into different vertical positions and/or circumferential positions with which the sensor can then be aligned. On the other hand, however, the sensor may also be brought into different vertical positions and/or circumferential positions relative to the positioning aid and then can be aligned with the positioning aid. In the latter case, the positioning aid has already been applied directly to the container or holder, for example by printing or adhesion, before the container is received by the holder, wherein in particular, the positioning aid is fixed, i.e. immobile, i.e. cannot itself be brought into different vertical positions or circumferential positions. In principle, however, the case may also be envisaged in which initially, before or after applying the positioning aid, it is brought into a specific vertical position and/or circumferential position relative to a reference point on the container and/or holder and then the sensor is brought into a predetermined vertical position and/or circumferential position relative to the positioning aid which has been positioned in this manner. The vertical position or circumferential position of the positioning aid and the vertical position or circumferential position of the sensor are then associated with a specific bioprocess engineering application in the allocation list.

Various embodiments provide a sensor positioning system for a bioprocess engineering unit, wherein a container, in particular a single-use container, is provided for receiving a biological medium which, when installed, extends in the axial direction from an upper container end to a lower container end, wherein a holder is provided for holding the container when installed, wherein a sensor is provided for fixing to the container, characterized in that a positioning aid device for positioning the sensor to be fixed is provided on the container in a predetermined position, in that the positioning aid device has a positioning aid that is applied or can be applied directly to the container or near the container on the holder, which can be brought into different vertical positions and/or circumferential positions relative to at least one reference point provided on the container and/or holder, and in that the positioning aid device has a technical storage medium or analog print medium with an allocation list in which a plurality of bioprocess engineering applications are respectively allocated a predetermined vertical position and/or circumferential position of the positioning aid.

In various embodiments, the storage medium or print medium comprises an electronic, magnetic, optical or photographic storage medium or a print medium in the form of paper or foil.

In various embodiments, in the allocation list, at least one, in particular exactly one reference point provided on the container and/or holder is respectively allocated to the plurality of bioprocess engineering applications, wherein one predetermined vertical position and/or circumferential position of the positioning aid is respectively allocated to the respective reference point.

In various embodiments, the positioning aid on the container or holder in its entirety can be immovably disposed in the axial direction in different positions relative to the respective reference point, or in that the positioning aid can be immovably applied to the container or holder, wherein prior to applying the positioning aid, a part of the positioning aid which is mobile relative to the container and/or the holder and/or the rest of the positioning aid can be disposed along the rest of the positioning aid in different positions, which when the positioning aid has been applied respectively correspond to a specific position relative to the respective reference point, or in that the positioning aid is immovably applied to the container or holder, wherein a part of the positioning aid which is mobile relative to the container and/or holder can be disposed in the axial direction in different positions relative to the respective reference point.

In various embodiments, the positioning aid on the container or holder in its entirety can be immovably disposed in the circumferential direction in different positions relative to the respective reference point, or in that the positioning aid can be immovably applied to the container or holder, wherein prior to applying the positioning aid, a part of the positioning aid which is mobile relative to the container and/or the holder and/or the rest of the positioning aid can be disposed transversely to the rest of the positioning aid in different positions which, when the positioning aid has been applied, respectively correspond to a specific position relative to the respective reference point, or in that the positioning aid is immovably applied to the container or holder, wherein a part of the positioning aid which is mobile relative to the container and/or holder can be disposed in the circumferential direction in different positions relative to the respective reference point.

In various embodiments, the positioning aid is connectable to the container and/or to the holder in a material-bonding, interlocking and/or force-fitting manner.

In various embodiments, the positioning aid is provided with at least one marking with which the sensor can be aligned, wherein the positioning aid has or itself forms the at least one marking.

In various embodiments, the positioning aid is a template which can be placed on the container, which in particular can be adhered to the container, or in that the positioning aid is a marking support which can be placed on the container or near the container on the holder and has a plurality of markings, in particular in the form of divisions, such as a marking support which is configured as a rod or strip which in particular can be fastened to the container and/or the holder or can be placed on the container and/or holder, such as wherein at least one moveable slide is disposed on the marking support between the markings, or in that a plurality of markings, in particular in the form of divisions, applied directly on the container and/or holder are provided as the positioning aid.

In various embodiments, the positioning aid is separate from the holder and/or a door of the holder or is integrated into the holder and/or a door of the holder, and/or in that the storage medium or print medium is separate from the container and/or holder or is applied to the container and/or holder, in particular adhered.

In various embodiments, the container is a bioprocess bag or a dimensionally stable vessel, such as for a bioreactor or a process mixing system, and/or in that the container has an integrated stirring apparatus.

In various embodiments, one or more reference points are formed on the container by the upper or the lower container ends, by a bag seam, by a mechanical stop on the container, by a mechanical stop on a stirring shaft of the stirring apparatus and/or by a connection piece on the container, and/or in that one or more reference points on the holder are formed by an edge, in particular an opening, and/or by a mechanical stop on the holder.

In various embodiments, the sensor is configured as an inductive sensor, as a capacitive sensor, as an optical sensor, as an ultrasound sensor, as a microwave sensor, as a radar sensor or as a sensor for measuring the electrical conductivity or thermal conductivity, and/or in that the sensor is configured as a fill level sensor, such as a fill level limit switch or as a sensor for continuous fill level measurement, and in particular is a foam sensor.

Various embodiments provide a sensor positioning system for a bioprocess engineering unit, wherein a container, in particular a single-use container, is provided for receiving a biological medium which, when installed, extends in the axial direction from an upper container end to a lower container end, wherein a holder is provided for holding the container when installed, wherein a sensor is provided for fixing to the container, characterized in that a positioning aid device for positioning the sensor to be fixed is provided on the container in a predetermined position, in that the positioning aid device has a positioning aid that is applied directly to the container or near the container on the holder, relative to which the sensor can be brought into different vertical positions and/or circumferential positions, and in that the positioning aid device has a technical storage medium or analog print medium with an allocation list in which a plurality of bioprocess engineering applications are respectively allocated a predetermined vertical position and/or circumferential position of the sensor.

Various embodiments provide a bioprocess engineering unit, in particular a bioreactor or a process mixing system, with a sensor positioning system as described herein.

Various embodiments provide a method for positioning a sensor of a bioprocess engineering unit, in particular using a sensor positioning system as described herein, wherein a container, in particular a single-use container, is provided for receiving a biological medium, wherein the container is received by a holder which holds the container in a manner such that the container extends in the axial direction from an upper container end to a lower container end, characterized in that after the container has been received by the holder, the sensor is aligned with a positioning aid of a positioning aid device and fixed to the container, wherein the alignment is based on a predetermined vertical position and/or circumferential position which is allocated to one of a plurality of bioprocess engineering applications in an allocation list of a technical storage medium or analog print medium.

In various embodiments, after the container has been received by the holder, the positioning aid is applied directly to the container or holder, wherein as it is being applied, the positioning aid is brought into the predetermined vertical position and/or circumferential position relative to at least one reference point provided on the container and/or holder, wherein the sensor is then aligned with the positioning aid, or in that the positioning aid has already been applied directly to the container or holder prior to setting the predetermined vertical position and/or circumferential position, possibly also already before the container has been received by the holder, wherein the positioning aid is then brought into the predetermined vertical position and/or circumferential position relative to at least one reference point provided on the container and/or holder, wherein after this, the sensor is aligned with the positioning aid, or in that prior to application to the container or holder, in particular after the container has been received by the holder, the positioning aid is brought into a predetermined position which, when the positioning aid has been applied, corresponds respectively to a specific vertical position and/or circumferential position relative to at least one reference point provided on the container and/or holder, wherein the positioning aid is then applied directly to the container or holder, wherein the sensor is then aligned with the positioning aid.

In various embodiments, the positioning aid has already been applied directly to the container or holder prior to the container being received by the holder, wherein after the container has been received by the holder, the sensor is brought into the predetermined vertical position and/or circumferential position relative to the positioning aid and is aligned with the positioning aid.

BRIEF DESCRIPTION OF THE DRAWINGS

Various aspects will now be described in more detail with the aid of the drawings which are given purely by way of exemplary embodiments. In the drawings.

DETAILED DESCRIPTION

Figure 1:
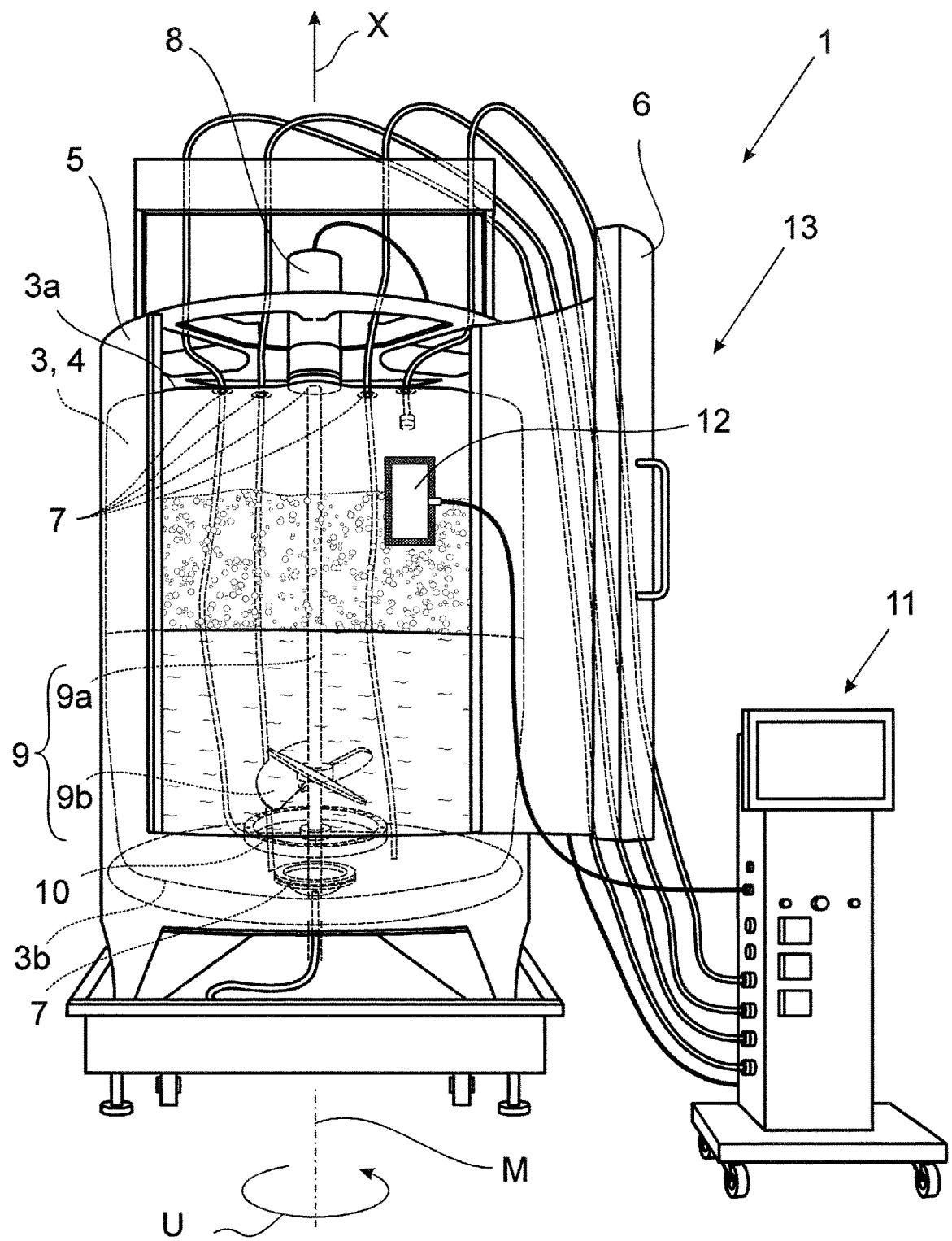
FIG. 1 shows a proposed bioprocess engineering unit with a proposed sensor positioning system.

FIG. 1 schematically shows a bioprocess engineering unit 1 in the form of a bioreactor 2. The bioreactor 2 has a container 3, in particular a single-use container, for receiving a biological medium, in this case a biological reaction medium, wherein the reaction medium in particular contains microorganisms such as bacteria, yeasts, viruses or the like, or tissue cells such as animal cells, plant cells or the like, as well as a nutrient medium. In this case, the container 3 is configured as a bioprocess bag 4, i.e. as a container with walls that are flexible at least in sections. In principle, in an alternative embodiment, not shown here, the container 3 may also be configured as a dimensionally stable vessel.

In order to form a microbial or cellular product, culture of the microorganisms or tissue cells is carried out in the container 3 under predetermined conditions. In addition to the microorganisms or tissue cells on the one hand and the nutrient medium on the other hand, the container 3 may also allow other liquid or gaseous media such as oxygen, pH correction agents or the like to be supplied and the fermentation broth which is formed the culture and also any gases collecting in the headspace of the container 3 to be respectively discharged. The discharged fermentation broth may then be fed inter alia to a filter or a centrifuge in order to obtain the product.

A further exemplary embodiment of a bioprocess engineering unit 1, not shown here, is a process mixing system that can be used for mixing powders, suspensions, solutions or emulsions that can be used in biotechnological processes, for example in a downstream or upstream process.

Furthermore, the proposed bioprocess engineering unit 1, in this case in the form of the bioreactor 2, has a holder 5, in this case in the form of a stainless-steel housing, in which the container 3, in this case a single-use container, is installed. When installed, the container 3 extends in the axial direction X, in this case in the vertical or gravitational direction, from an upper container end 3a to a lower container end 3b. Broadly, the term "holder" 5 means a device of the bioprocess engineering unit 1 which receives the container 3 when installed and therefore holds it. As in the case here of the stainless-steel housing, the holder 5 can, as here, at least partially and in some embodiments completely surround the container 3 and therefore receive the container 3 inside it in order to hold the container 3 during operation of the bioprocess engineering unit 1 and to stabilize it mechanically. In this case, the holder 5 furthermore has a door 6, which in this case is pivotable between an open position shown schematically in FIG. 1 and a closed position, not shown, about a pivot axis which is parallel to the axial direction X. In the closed position of the door 6, the holder 5 here has an overall substantially cylindrical shape with a cylindrical axis extending in the axial direction X. The container 3, which in this case is in the form of the bioprocess bag 4, in this case has a corresponding shape which is selected such that when installed, the exterior of the container 3 intentionally rests on the inside of the wall of the holder 5 or stainless-steel housing.

In this case, the container 3 has a plurality of connection pieces 7 which here can respectively serve to receive or connect a pneumatic and/or hydraulic section of line and/or a sensor or a probe and/or for connection of a drive motor 8. Some of the connection pieces 7 here are disposed in the upper half of the container, in particular in the region of the upper container end 3*a*, and another of the connection pieces 7 is disposed in the lower half of the container, in particular in the region of the lower container end 3*b*. As an example, the latter forms a bottom outlet for discharging fermentation broth. The further connection pieces 7 may comprise connection pieces for introducing gaseous and/or liquid media into the interior of the container and/or for discharging in particular gaseous media, from the interior of the container, as well as a $pO_2$ connection piece for connecting a $pO_2$ or DO sensor, a pH sensor connection piece for connecting a pH sensor, a temperature sensor connection piece for connecting a temperature sensor or a sampling connection piece for connecting a sampling probe.

In this case, the drive motor 8 serves to drive an optional stirring apparatus 9, which in this case is integrated into the container 3. In this case, the stirring apparatus 9 has a stirring shaft 9*a* as well as at least one stirring means 9*b*, in this case in the form of a propeller stirrer. The stirring apparatus 9 serves to thoroughly mix the biological reaction broth during culture. In the axial direction X below the single stirring means 9*b* shown here, FIG. 1 furthermore shows an optional gasification device 10 which in this case is for the supply of oxygen to the reaction medium.

As shown in FIG. 1, and also by way of example, the connection pieces 7 may be connected to a control device 11 for controlling the process via electrical and/or hydraulic and/or pneumatic line sections; this also forms part of the bioprocess engineering unit 1.

Furthermore, the bioprocess engineering unit 1, as shown in FIG. 1, has a sensor 12 which is fixed to the container 3, in particular to the outside. In some embodiments, the sensor 12 is an inductive sensor, a capacitive sensor, an optical sensor, an ultrasound sensor, a microwave sensor, a radar sensor or a sensor for measuring the electrical conductivity or thermal conductivity. In this case, the sensor 12 is a fill level sensor and serves in particular for continuous fill level measurement. As an alternative, a fill level sensor may also be provided which acts to measure the limit level. In the latter case, the fill level sensor is then configured as a fill level limit switch. In this case, the fill level sensor is a foam sensor which permits continuous monitoring of the height of the foam forming above the fluid level. The fill level to be determined is correspondingly defined by the top of the foam layer. In this case, the fill level sensor is mentioned purely by way of example. In principle, as the sensor 12 for the bioprocess engineering unit 1, it is not vital for this to be provided per se for the determination of fill levels; a sensor 12 for determining other physical parameters may also be provided. As an example, the number of cells in the biological medium could also be determined by a sensor.

The bioprocess engineering unit 1 as proposed is equipped with a sensor positioning system 13 with the aid of which the sensor 12 can be positioned and then fixed to the container 3 in an optimal manner for a specific bioprocess engineering application. The proposed sensor positioning system 13 of the bioprocess engineering unit 1 in this case comprises the container 3 as well as the holder 5 and the sensor 12 of the bioprocess engineering unit 1 to be fixed.

What is essential here is that a positioning aid device 14 for positioning the sensor 12 to be fixed is provided on the container 3 in a predetermined position, that the positioning aid device 14 has a positioning aid 15 that is applied to or can be applied directly to the container 3 or near the container 3 on the holder 5, which can be brought into different vertical positions and/or circumferential positions relative to at least one reference point P provided on the container 3 and/or holder 5, and that the positioning aid device 14 has a technical storage medium or analog print medium 16 with an allocation list 17 in which a plurality of bioprocess engineering applications are respectively allocated a predetermined vertical position and/or circumferential position of the positioning aid 15.

The positioning aid device 14, which is also a part of the sensor positioning system 13, will now be described in more detail.

As mentioned, the positioning aid 15 may be applied directly to the container 3. Alternatively, however, application may also be made, and in fact indirectly or directly, to the holder 5 and near the container 3. As will be explained in more detail below, the positioning aid 15 may be applied to the container 3 or the holder 5 even before it is brought into the respective vertical position and/or circumferential position. Alternatively, it is also envisageable to first bring the positioning aid 15 into a predetermined position which, when the positioning aid 15 has been applied, corresponds to a specific vertical position and/or circumferential position, and only then connecting the positioning aid 15 to the container 3 and/or holder 5. After the positioning aid 15 has been positioned in a vertical position and/or circumferential position relative to the reference point P which corresponds to a specific bioprocess engineering application, the sensor 12 can then be aligned with the positioning aid 15 and in this manner can be fixed on the container 3 in the predetermined position for this application. In particular, after the positioning aid 15 has been positioned relative to the reference point P in the vertical position and/or circumferential position which corresponds to the specific application, a projection on the positioning aid 15 directed orthogonally to the axial direction X lies inside a section of the container 13 or the container wall.

Figure 2:
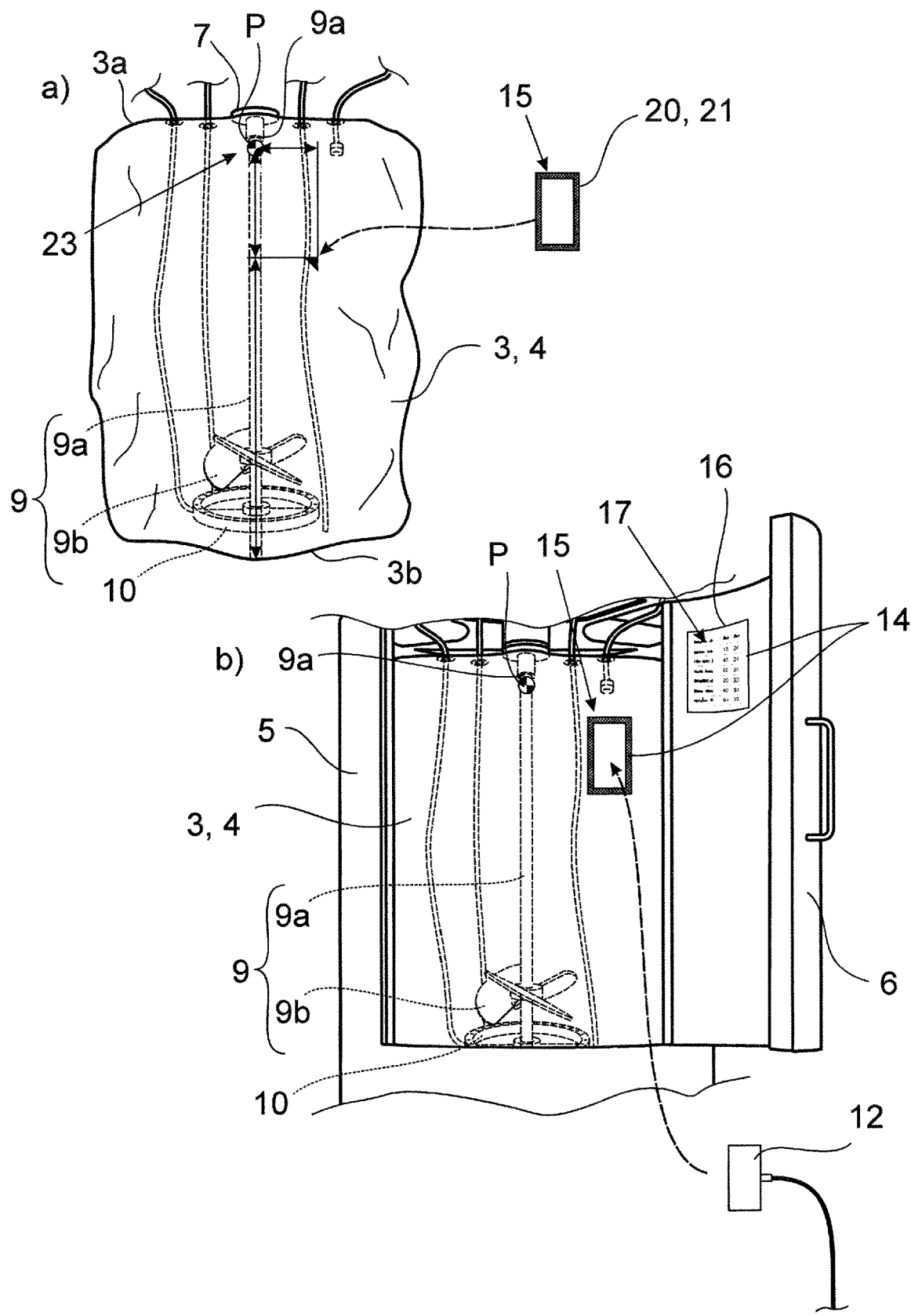
FIG. 2 shows a schematic view of the positioning of a sensor of the bioprocess engineering unit in accordance with FIG. 1 by means of a proposed sensor positioning system in accordance with a first exemplary embodiment.
Figure 3:
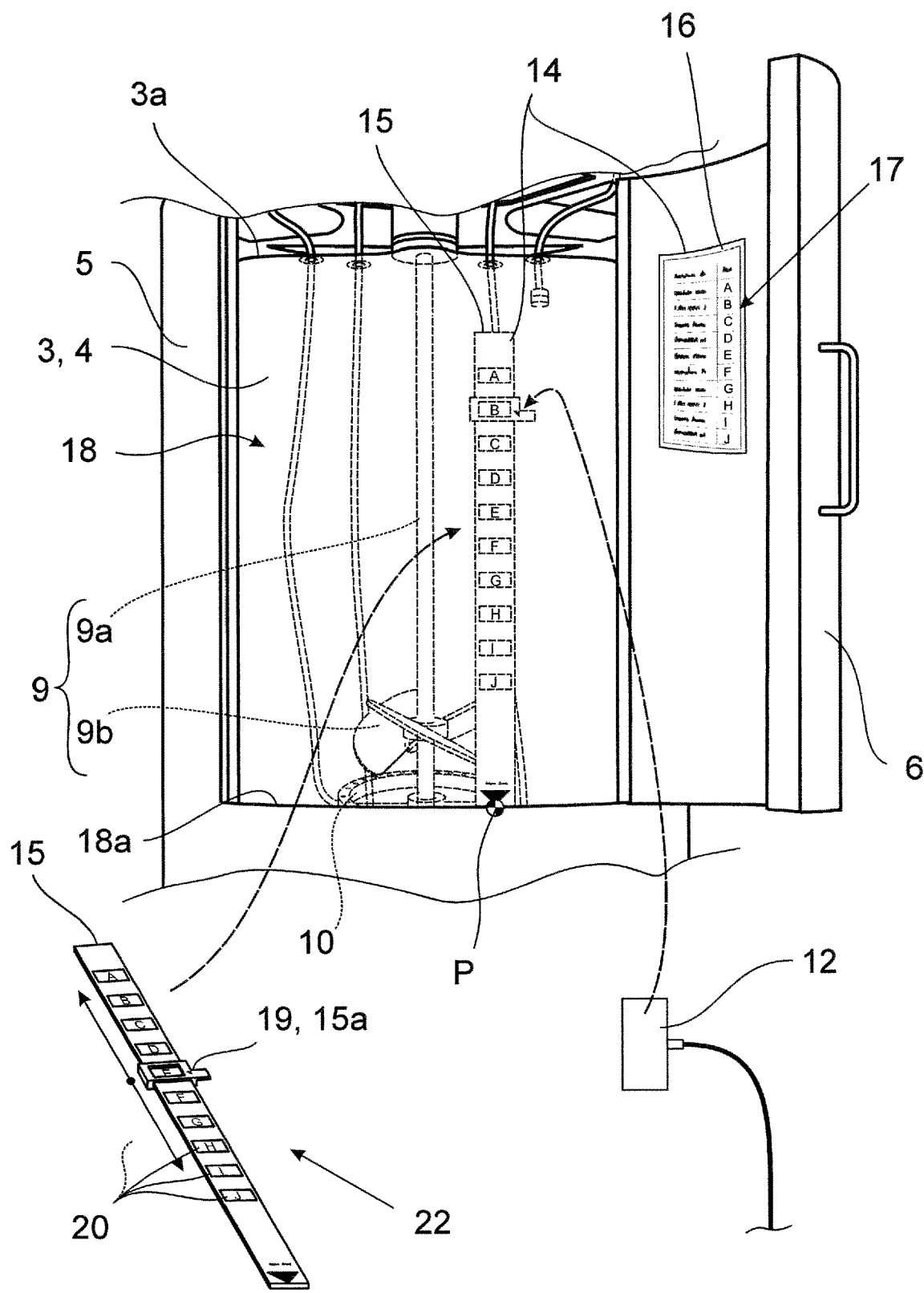
FIG. 3 shows a schematic view of the positioning of a sensor by means of a proposed sensor positioning system in accordance with a further exemplary embodiment.

In this case, as can be seen in FIGS. 2 and 3, the storage medium or print medium 16 is in the form of a foil, upon which the allocation list 17 is printed. The allocation list 17 stores the vertical positions in accordance with FIG. 2 as distances to the respective reference point P. Furthermore, the allocation list 17 also stores additional circumferential positions, in this case also as distances to the respective reference point P, as will be explained in more detail below. Thus, in accordance with FIG. 2, the list therefore comprises a plurality of bioprocess engineering applications and for each bioprocess engineering application, comprises a vertical position in the form of a distance to the reference point P and a circumferential position in the form of a distance to the reference point P. In the exemplary embodiment in FIG. 3, in contrast, by way of example, only vertical positions are stored in the allocation list 17 as positions A, B, . . . J which, when the positioning aid 15 is applied, can be indicated with respect to the respective reference point P via the positioning aid 15. In the latter exemplary embodiment, the allocation list 17 shows only one vertical position in the form of the respective position A, B, . . . J by the individually listed bioprocess engineering applications, but no circumferential positions in this case. The circumferential position is always the same. However, again in this exemplary embodiment, in principle, circumferential positions could also be stored, for example also in the form of corresponding positions.

In accordance with an embodiment that is not shown here, it is also possible to provide that in the allocation list 17, at least one, in particular exactly one reference point P provided on the container 3 and/or holder 5 is respectively allocated to the plurality of bioprocess engineering applications, wherein one predetermined vertical position and/or circumferential position of the positioning aid 15 is respectively allocated to the respective reference point P. Thus, different reference points P may be allocated to different bioprocess engineering applications. However, it is also envisageable for the same reference point P to be provided for all bioprocess engineering applications, as is the case with the exemplary embodiments shown.

As already mentioned, in the allocation list 17, as can be seen in FIG. 2 by way of example, a predetermined circumferential position of the positioning aid 15 may also be respectively allocated to the plurality of bioprocess engineering applications. In addition, it is also possible to provide that in the allocation list 17, at least one, in particular exactly one reference point P provided on the container 3 and/or holder 5 is respectively allocated to the plurality of bioprocess engineering applications, wherein a respective predetermined circumferential position of the positioning aid 15 is allocated to the respective reference point P. The reference point P to which the predetermined vertical position of the positioning aid 15 is allocated can be the same reference point P to which the predetermined circumferential position of the positioning aid 15 is allocated, as is the case in FIG. 2. Thus, in this case, a common reference point P is provided for the vertical position and for the circumferential position. However, different reference points P may also be provided for the vertical position on the one hand and for the circumferential position on the other hand.

In accordance with the exemplary embodiment in FIG. 2, the positioning aid 15 on the container 3 or holder 5 in its entirety can be immovably disposed at least in the axial direction X in different positions relative to the respective reference point P. "Can be disposed" means that the positioning aid 15 can be fastened, for example adhered, attached or the like, or it can be positioned or put on the container 3 and/or holder 5.

In accordance with FIG. 3, the positioning aid 15 can alternatively be immovably attached to the container 3 or holder 5, in this case, as an example, by positioning the positioning aid 15 on an edge 18a, in this case a lower edge, of the opening 18 which can be closed by the door 6, wherein prior to applying the positioning aid 15, a part 15a of the positioning aid 15 which is mobile relative to the container 3 and/or the holder 5 and/or the rest of the positioning aid 15, in this case a slide 19, can be disposed in different positions along the rest of the positioning aid 15. The positions respectively correspond to a specific position relative to the respective reference point P when the positioning aid 15 has been applied. The mobile part 15a or the slide 19 can therefore be brought into one of the positions A, B, . . . J allocated to the respective application in the allocation list 17, wherein these positions respectively correspond to a position relative to the respective reference point P when the positioning aid 15 has been applied.

The disposed state of the positioning aid 15 is shown in FIG. 3 in dashed lines. It is now also envisageable for the positioning aid 15 to be initially immovably attached to the container 3 or holder 5, wherein only then a part 15a of the positioning aid 15 which is mobile relative to the container 3 and/or holder 5, in particular a slide 19, is brought into the respective position A, B, . . . J in the axial direction X relative to the respective reference point P which corresponds to the specific application.

The above statements are also applicable to the circumferential positions. Thus, as stated, the positioning aid 15 may also be brought into different circumferential positions relative to at least one reference point P provided on the container 3 and/or holder 5. In this case, as can be seen in FIG. 2, for example, the positioning aid 15 on the container 3 or holder 5 in its entirety can be immovably disposed in the circumferential direction U, i.e. in a direction around the central axis M of the container running in the axial direction X, in different positions relative to the respective reference point P. As an alternative, it is also envisageable here that the positioning aid 15 can be immovably applied to the container 3 or holder 5, wherein prior to applying the positioning aid 15, a part 15a of the positioning aid 15 which is mobile relative to the container 3 and/or the holder 5 and/or the rest of the positioning aid 15, in particular a slide 19, can be disposed transversely to the rest of the positioning aid 15 in different positions, which, when the positioning aid 15 has been applied, respectively correspond to a specific position relative to the respective reference point P. Alternatively again, it can also be provided that the positioning aid 15 may be immovably applied to the container 3 or holder 5, wherein only then a part 15a of the positioning aid 15 which is mobile relative to the container 3 and/or holder 5, in particular a slide 19, can be disposed in the circumferential direction U in different positions relative to the respective reference point P.

In this case, the positioning aid 15 is respectively connectable to the container 3 and/or to the holder 5 in a material-bonding, interlocking and/or force-fitting manner. The connection may be a non-destructive releasable connection or a permanent, i.e. not non-destructive, releasable connection. In some embodiments, the positioning aid 15 in the sensor positioning system 13 does not have a supporting function per se, and therefore does not take up any loads exerted by the container 3 or by the holder 5. The positioning aid 15 may be produced from a plastic material, such as HDPE (hard polyethylene, high density polyethylene), or it may be produced from metal.

In this case, the positioning aid 15 is provided with at least one marking 20 with which the sensor 12 can be aligned. In the exemplary embodiment in FIG. 2, the positioning aid 15 itself forms the marking 20. In the exemplary embodiment in FIG. 3, the positioning aid 15 in particular has at least one, in this case a plurality of markings 20. "Markings" 20 are in particular lines, dots, characters, words, symbols or the like. In this manner, after the positioning aid 15 has been positioned relative to the reference point P in a vertical position and/or circumferential position corresponding to a specific bioprocess engineering application, the sensor 12 can be aligned with the markings or markings 20 and in this manner can be fixed in the predetermined position on the container 3 for this application. In particular, after the positioning aid 15 has been positioned relative to the reference point P in the vertical position and/or circumferential position which corresponds to the specific application, a projection of the marking 20 or markings 20 directed orthogonally to the axial direction X lies inside a section of the container 13 or the container wall.

In accordance with the exemplary embodiment in FIG. 2, the positioning aid 15 is a template 21 which can be placed on the container 3, in particular directly on the container 3 or at a small distance from the container 3 which is a maximum of 10 cm, a maximum of 5 cm, or a maximum of 1 cm. A template is an outline which forms boundaries inside which the sensor 12 can be placed. In FIG. 2, by way of example, the template 21 is in the form of a complete peripheral frame. In particular, the template 21 is adhesive and in this case, as can be seen in FIG. 2, is adhered directly to the container 3.

In a variation, as can be seen in the exemplary embodiment in FIG. 3, the positioning aid 15 is a marking support 22 that can be placed on the container 3 or near the container 3 on the holder 5 and which has a plurality of markings 20. By way of example, the plurality of markings 20 are in the form of divisions (a scale), i.e. in the form of a plurality of regularly or irregularly spaced markings 20, in particular lines, dots or the like. In some embodiments, the marking support 22 is configured as a rod or strip and in particular can be fastened to the container 3 and/or holder 5 or can be positioned or put on the container 3 and/or holder 5. In some embodiments, at least one, in this case exactly one moveable slide 19 is disposed on the marking support 22 between the markings 20, as can be seen in FIG. 3.

In another variation, which is not shown here, a plurality of markings 20 are applied directly to the container 3 and/or holder 5 as the positioning aid 15, in particular printed and/or adhered. The plurality of markings 20 are in the form of divisions (a scale).

The positioning aid 15 and the allocation list 17 may be disposed relative to rest of the sensor positioning system 13 in different manners.

Thus, the positioning aid 15 can be a part that is separate from the holder 5 and/or the door 6. "Separate" means that when not applied, the positioning aid 15 is separate from the holder 5 and/or the door 6. However, in principle, the positioning aid 15 may also be integrated into the holder 5 and/or the door 6, for example as a template which is integrated into the holder 5 and/or into the door 6.

In addition or as an alternative, the storage medium or print medium 16 is separate from the container 3 and/or holder 5, i.e. not connected to the container 3 and/or holder 5, or applied to the container 3 and/or holder 5, in particular adhered, for example as in this case to the inside or outside of the door 6.

One or more reference points P on the container 3 relative to which the positioning aid 15 can be brought into different vertical positions and/or circumferential positions, are in particular formed by the upper or lower container ends 3a, 3b, by a bag seam, by a mechanical stop, for example a projection or a groove, on the container 3, by a connection piece 7, for example a sensor connection piece, sampling connection piece, etc., and/or as in FIG. 2 by a mechanical stop 23, for example a projection or a groove, on the stirring shaft 9a of the stirring apparatus 9. One or more reference points P on the holder 5, relative to which the positioning aid 15 can be brought into different vertical positions and/or circumferential positions, are in particular formed by an edge 18a, for example upper, lower or side edge, in particular an opening 18, and/or by a mechanical stop, for example a projection or a groove, on the holder 5.

In accordance with a further tenet not illustrated here, a sensor positioning system 13 for a bioprocess engineering unit 1 is disclosed, wherein a container 3, in particular a single-use container, is provided for receiving a biological medium which, when installed, extends in the axial direction X from an upper container end 3a to a lower container end 3b, wherein a holder 5 is provided for holding the container 3 when installed, wherein a sensor 12 to be fixed is provided on the container 3. Furthermore, a positioning aid device 14 for positioning the sensor 12 to be fixed is provided on the container 3 in a predetermined position, wherein the positioning aid device 14 has a positioning aid 15 that is applied directly to the container 3 or near the container 3 on the holder 5, relative to which the sensor 12 can be brought into different vertical positions and/or circumferential positions, and wherein the positioning aid device 14 has a technical storage medium or analog print medium 16 with an allocation list 17, in which a plurality of bioprocess engineering applications are respectively allocated a predetermined vertical position and/or circumferential position of the sensor 12.

What is essential here is that the sensor 12 is brought into a specific vertical position and/or circumferential position relative to an in particular fixed, i.e. immobile positioning aid 15, and then is fixed on the container 3 in the respective position relative to the positioning aid 15. In some embodiments, a plurality of markings 20 are applied directly to the container 3 and/or holder 5 as the positioning aid 15, in particular printed and/or adhered. The plurality of markings 20 are, for example, disposed in the form of divisions (a scale), in particular measurement divisions. The sensor positioning system 13 and/or the bioprocess engineering unit 1 may also have individual features which have been described in respect of the sensor positioning system 13 of the first tenet. In respect of the proposed sensor positioning system 13 of the further tenet, all of the embodiments of the first-mentioned tenet are of relevance.

In accordance with a further tenet, a bioprocess engineering unit 1, in particular a bioreactor 2 or a process mixing system, is disclosed with a proposed sensor positioning system 13. In respect of the proposed bioprocess engineering unit 1, all of the embodiments of the first-mentioned and second-mentioned tenet are of relevance.

In accordance with a further tenet, a method is disclosed for positioning a sensor 12 of a bioprocess engineering unit 1, in particular using a proposed sensor positioning system 13, wherein a container 3, in particular a single-use container, is provided for receiving a biological medium, wherein the container 3 is received by a holder 5 which holds the container 3 in a manner such that the container 3 extends in the axial direction X from an upper container end 3a to a lower container end 3b. In this regard it is provided that, after the container 3 has been received by the holder 5, the sensor 12 is aligned with a positioning aid 15, which may be fixed or mobile, of a positioning aid device 14 and fixed to the container 3, wherein the alignment is based on a predetermined vertical position and/or based on a predetermined circumferential position which is allocated to one of a plurality of bioprocess engineering applications in an allocation list 17 of a technical storage medium or analog print medium 16. In respect of the proposed method, all embodiments of the other tenets are of relevance.

As can be seen in FIG. 2, in some embodiments, after the container 3 has been received by the holder 5, the positioning aid 15 is applied directly to the container 3 or holder 5. In this regard, as it is being applied, the positioning aid 15 is brought into a predetermined vertical position and into a predetermined circumferential position relative to at least one reference point P provided on the container 3 and/or holder 5 (FIG. 2a). The sensor 12 is then aligned with the positioning aid 15 (FIG. 2b). The predetermined vertical position or circumferential position, based on which the alignment of the sensor 12 is carried out, is therefore a vertical position or circumferential position of the positioning aid 15, wherein as it is being applied, the positioning aid 15 is brought into the predetermined vertical position or circumferential position. In particular, in this manner, the positioning aid 15 is brought into its predetermined vertical position or circumferential position in a manner such that as it is being applied, it is entirely disposed in a predetermined position relative to the respective reference point P. Next, after the positioning aid 15 has been positioned relative to the reference point P in the vertical position and/or circumferential position corresponding to the specific bioprocess engineering application, the sensor 12 is aligned with the positioning aid 15 and fixed to the container 3.

In addition or as an alternative, it may also be provided that the positioning aid 15 has already been applied directly to the container 3 or holder 5 prior to setting the predetermined vertical position and/or prior to setting the predetermined circumferential position, possibly also already before the container 3 has been received by the holder 5. The positioning aid 15 is then brought into the predetermined vertical position or circumferential position relative to at least one reference point P provided on the container 3 and/or holder 5, wherein after this, the sensor 12 is aligned with the positioning aid 15. Here again, the predetermined vertical position or circumferential position, based on which the alignment of the sensor 12 is carried out, is a vertical position or circumferential position of the positioning aid 15, but wherein the positioning aid 15 has already been applied before it is brought into the predetermined vertical position or circumferential position. In particular, the positioning aid 15 is therefore brought into its predetermined vertical position or circumferential position in a manner such that a mobile part 15a of the positioning aid 15, in particular a slide 19, is disposed in a predetermined position relative to the respective reference point P. Next, after the positioning aid 15 has been positioned relative to the reference point P in the vertical position and/or circumferential position corresponding to the specific bioprocess engineering application, the sensor 12 is then aligned to the positioning aid 15.

In the exemplary embodiment in FIG. 3, prior to application to the container 3 or holder 5, in particular after the container 3 has been received by the holder 5, the positioning aid 15 is brought into a predetermined position which, when the positioning aid 15 has been applied, corresponds respectively to a specific vertical position and/or a predetermined circumferential position relative to at least one reference point P provided on the container 3 and/or holder 5. In this regard, the positioning aid 15 is brought into the predetermined position wherein the moveable part 15a or in this case the slide 19 is adjusted relative to the rest of the positioning aid 15. The positioning aid is then applied directly to the container 3 or holder 5. The sensor 12 is then aligned with the positioning aid 15. Here again, the predetermined vertical position and/or circumferential position, based on which the alignment of the sensor 12 is carried out, is a vertical position or circumferential position of the positioning aid 15, but wherein the positioning aid 15 is only applied after it has been brought into a position corresponding to one of the predetermined vertical positions or circumferential positions. In particular, here again, the positioning aid 15 is therefore brought into its predetermined vertical position or circumferential position in a manner such that a mobile part 15a of the positioning aid 15, for example a slide 19, is disposed in a predetermined position relative to the rest of the positioning aid 15, the applied position of the positioning aid 15 corresponding to the predetermined position relative to the respective reference point P. Then, after the positioning aid 15 has been applied, the sensor 12 is aligned with the positioning aid 15.

In accordance with an alternative method which is not described in the exemplary embodiments it can also be provided that the positioning aid 15 has already been applied directly to the container 3 or holder 5 prior to the container 3 being received by the holder 5. Then, after the container 3 has been received by the holder 5, the sensor 12 is brought into a predetermined vertical position and/or into a predetermined circumferential position relative to the positioning aid 15 and is then aligned with the positioning aid 15. In this regard, the predetermined vertical position and/or circumferential position, based on which the alignment of the sensor 12 is carried out, is a vertical position or circumferential position of the sensor 12, wherein in particular, the positioning aid 15 is fixed, i.e., immobile, to the container 3 or holder 5. Thus, the sensor 12 is brought into a specific vertical position or circumferential position relative to a positioning aid 15 which in particular is fixed, i.e. immobile, and then fixed to the container 3 in the respective position relative to the positioning aid 15.

The invention claimed is:

1. A sensor positioning system for a bioprocess engineering unit comprising:
    a container for receiving a biological medium which, when installed, extends in the axial direction from an upper container end to a lower container end,
    a holder configured for holding the container when installed,
    a sensor configured for fixing to the container, and
    a positioning aid device for positioning the sensor to be fixed, wherein the positioning aid device is provided on the container in a predetermined position, wherein the positioning aid device has a positioning aid that is applied directly to the container or near the container on the holder, which is configured to be brought into different vertical positions and/or circumferential positions relative to at least one reference point provided on the container and/or holder,
    wherein the positioning aid device has a technical storage medium or analog print medium with an allocation list in which a plurality of bioprocess engineering applications are respectively allocated a predetermined vertical position and/or circumferential position of the positioning aid, and
    wherein the positioning aid is provided with at least one marking with which the sensor can be aligned.

2. The sensor positioning system as claimed in claim 1, wherein the storage medium or print medium comprises an electronic, magnetic, optical or photographic storage medium or a print medium in the form of paper or foil.

3. The sensor positioning system as claimed in claim 1, wherein in the allocation list, at least one provided on the container and/or holder is respectively allocated to the plurality of bioprocess engineering applications, wherein one predetermined vertical position and/or circumferential position of the positioning aid is respectively allocated to the respective reference point.

4. The sensor positioning system as claimed in claim 1, wherein the positioning aid on the container or holder in its entirety can be immovably disposed in the axial direction in different positions relative to the respective reference point, or wherein the positioning aid is configured to be immovably applied to the container or holder, wherein prior to applying the positioning aid, a part of the positioning aid which is mobile relative to any of the container, the holder, and the rest of the positioning aid can be disposed along the rest of the positioning aid in different positions, which when the positioning aid has been applied respectively correspond to a specific position relative to the respective reference point, or wherein the positioning aid is immovably applied to the container or holder, wherein a part of the positioning aid which is mobile relative to any of the container and the holder can be disposed in the axial direction in different positions relative to the respective reference point.

5. The sensor positioning system as claimed in claim 1, wherein the positioning aid on the container or holder in its entirety is configured to be immovably disposed in the circumferential direction in different positions relative to the respective reference point, or wherein the positioning aid is configured to be immovably applied to the container or holder, wherein prior to applying the positioning aid, a part of the positioning aid which is mobile relative to any of the container, the holder, and the rest of the positioning aid is configured to be disposed transversely to the rest of the positioning aid in different positions which, when the positioning aid has been applied, respectively correspond to a specific position relative to the respective reference point, or wherein the positioning aid is immovably applied to the container or holder, wherein a part of the positioning aid which is mobile relative to the container and/or holder is configured to be disposed in the circumferential direction in different positions relative to the respective reference point.

6. The sensor positioning system as claimed in claim 1, wherein the positioning aid is connectable to the container and/or to the holder in a material-bonding, interlocking and/or force-fitting manner.

7. The sensor positioning system as claimed in claim 1, wherein the positioning aid is a template which is configured to be placed on the container, or wherein the positioning aid is a marking support which is configured to be placed on the container or near the container on the holder and has a plurality of markings.

8. The sensor positioning system as claimed in claim 1, wherein the positioning aid is separate from the holder and/or a door of the holder or is integrated into the holder and/or a door of the holder, and/or wherein the storage medium or print medium is separate from the container and/or holder or is applied to the container and/or holder.

9. The sensor positioning system as claimed in claim 1, wherein the container is a bioprocess bag or a dimensionally stable vessel, and/or wherein the container has an integrated stirring apparatus.

10. The sensor positioning system as claimed in claim 1, wherein one or more reference points are formed on the container by the upper or the lower container ends, by a bag seam, by a mechanical stop on the container, by a mechanical stop on a stirring shaft of the stirring apparatus and/or by a connection piece on the container, and/or wherein one or more reference points on the holder are formed by an edge and/or by a mechanical stop on the holder.

11. The sensor positioning system as claimed in claim 1, wherein the sensor is configured as an inductive sensor, as a capacitive sensor, as an optical sensor, as an ultrasound sensor, as a microwave sensor, as a radar sensor or as a sensor for measuring the electrical conductivity or thermal conductivity, and/or wherein the sensor is configured as a fill level sensor.

12. The sensor positioning system as claimed in claim 1, wherein the positioning aid has or itself forms the at least one marking.

13. The sensor positioning system as claimed in claim 7, wherein a marking support which is configured as a rod or strip is configured to be fastened to the container and/or the holder or configured to be placed on the container and/or holder.

14. The sensor positioning system as claimed in claim 13, wherein at least one moveable slide is disposed on the marking support between the markings, or wherein a plurality of markings applied directly on the container and/or holder are provided as the positioning aid.

* * * * *